US009648294B2

United States Patent
Masuyama

(10) Patent No.: US 9,648,294 B2
(45) Date of Patent: May 9, 2017

(54) IMAGE SIGNAL PROCESSING METHOD AND SYSTEM, AND DISPLAY

(71) Applicant: BOE TECHNOLOGY GROUP CO., LTD., Beijing (CN)

(72) Inventor: Katsuhiro Masuyama, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 126 days.

(21) Appl. No.: 14/435,385

(22) PCT Filed: Sep. 5, 2014

(86) PCT No.: PCT/CN2014/086013
§ 371 (c)(1),
(2) Date: Apr. 13, 2015

(87) PCT Pub. No.: WO2015/154371
PCT Pub. Date: Oct. 15, 2015

(65) Prior Publication Data
US 2016/0249030 A1    Aug. 25, 2016

(30) Foreign Application Priority Data

Apr. 8, 2014    (CN) .......................... 2014 1 0138384

(51) Int. Cl.
*H04N 5/57*    (2006.01)
*H04N 5/58*    (2006.01)
(Continued)

(52) U.S. Cl.
CPC ............. *H04N 9/68* (2013.01); *H04N 1/6088* (2013.01); *H04N 9/64* (2013.01); *H04N 9/643* (2013.01); *H04N 5/20* (2013.01); *H04N 5/58* (2013.01)

(58) Field of Classification Search
CPC .......... H04N 9/68; H04N 1/6088; H04N 9/64; H04N 9/643; H04N 5/20; H04N 5/28; H04N 5/57; H04N 5/58
(Continued)

(56) References Cited

U.S. PATENT DOCUMENTS

2009/0174725 A1    7/2009    Kim et al.
2012/0001553 A1*   1/2012    Fletcher ................ G06F 1/1662
                                                          315/157
(Continued)

FOREIGN PATENT DOCUMENTS

CN      1988628 A       6/2007
CN      101115166 A     1/2008
CN      103957345 A     7/2014

OTHER PUBLICATIONS

First Chinese Office Action, for Chinese Patent Application No. 201410138384.3, dated Sep. 9, 2016, 11 pages.
(Continued)

*Primary Examiner* — Michael Lee
(74) *Attorney, Agent, or Firm* — Kinney & Lange, P.A.

(57) ABSTRACT

An image signal processing method, an image signal processing system, and a display are disclosed in the embodiments of the present invention. The method comprises: receiving a video signal; acquiring environmental parameter information of a display environment; adjusting, based on the environmental parameter information, a luminance and/or a chrominance of the video signal such that light of at least one spectral color generated by the video signal is adjusted accordingly; and outputting the adjusted video signal. With the image signal processing method according to the embodiments of the present invention, light of a particular spectral color can be adjusted based on a viewing environment so as to alleviate visual fatigue.

13 Claims, 3 Drawing Sheets

(51) Int. Cl.
      *H04N 9/68*       (2006.01)
      *H04N 9/64*       (2006.01)
      *H04N 1/60*       (2006.01)
      *H04N 5/20*       (2006.01)

(58) Field of Classification Search
      USPC .......................................................... 348/603
      See application file for complete search history.

(56) References Cited

U.S. PATENT DOCUMENTS

2012/0050307 A1*   3/2012   Mahowald ......... H05B 37/0218
                                                                     345/590
2012/0092172 A1*   4/2012   Wong ...................... G06F 3/011
                                                                       340/575

OTHER PUBLICATIONS

International Search Report dated Jan. 6, 2015, for corresponding PCT Application No. PCT/CN2014/086013.
Second Chinese Office Action, for Chinese Patent Application No: 201410138384.3, dated Dec. 30, 2016, 10 pages.

* cited by examiner

IMAGE SIGNAL PROCESSING METHOD AND SYSTEM, AND DISPLAY

CROSS-REFERENCE TO RELATED APPLICATION

This application claims the benefit of Chinese Patent Application No. 201410138384.3 filed on Apr. 8, 2014 in the State Intellectual Property Office of China, the whole disclosure of which is incorporated herein by reference.

BACKGROUND OF THE INVENTION

1. Field of the Invention

The disclosure of the present invention relates to the field of display technology, and particularly to an image signal processing method, an image signal processing system, and a display.

2. Description of the Related Art

A conventional image signal processing system for adjusting a luminance of a picture according to an ambient illuminance may be shown as in FIG. 1. A display signal may comprise a TV program signal from a tuner, and various video signals inputted from an input of a High Definition Multimedia Interface (HDMI) or an analog signal terminal. These signals can be inputted into a converter through a Moving Pictures Experts Group/Motion Pictures Experts Group (MPEG) decoder or a Y-C separator, and formats of the video signals are made uniform by the converter. In order to broadcast them on a display panel under the best state, the uniformed video signals may be processed through a luminance signal processing circuit and a chrominance signal processing circuit in advance before outputted to the display panel. During this process, an ambient illuminance sensor acquires a parameter relevant to the ambient illuminance, and a CPU can adjust, based on a preset correspondence relationship, the video signals accordingly in the luminance signal processing circuit and the chrominance signal processing circuit, respectively. Finally, the video signals are coupled to the display panel through a Low Voltage Differential Signaling (LVDS) circuit.

When the ambient illuminance in a viewing environment decreases, the image signal processing system with such a function reduces stimulus to user's eyes by decreasing a luminance of the display panel. However, its disadvantage is that, with such an adjusting mechanism, light of a particular spectral color cannot be adjusted based on the viewing environment. If continuously watching a large-size display for a long time, there is also a problem of easily resulting in visual fatigue.

SUMMARY OF THE INVENTION

According to embodiments of the present invention, there are provided an image signal processing method, an image signal processing system, and a display, by which light of a particular spectral color can be adjusted based on a viewing environment so as to alleviate visual fatigue.

In order to achieve the above object, the following technical solutions are adopted in the embodiments of the present invention.

In accordance with an aspect of the embodiments of the present invention, there is provided an image signal processing method comprising:

receiving a video signal;

acquiring environmental parameter information of a display environment;

adjusting, based on the environmental parameter information, a luminance and/or a chrominance of the video signal such that light of at least one spectral color generated by the video signal is adjusted accordingly; and outputting the adjusted video signal.

In another aspect, in accordance with an embodiment of the present invention, there is also provided an image signal processing system comprising:

a receiving unit for receiving a video signal;

a sensor for acquiring environmental parameter information of a display environment;

a processing circuit comprising a luminance signal processing circuit and/or a chrominance signal processing circuit respectively configured to adjust, based on the environmental parameter information, a luminance and/or a chrominance of the video signal such that light of at least one spectral color generated by the video signal is adjusted accordingly; and an output unit for outputting the adjusted video signal.

In accordance with a further embodiment of the present invention, there is also provided a display comprising the above-mentioned image signal processing system.

DETAILED DESCRIPTION OF THE EMBODIMENTS

Figure 1:
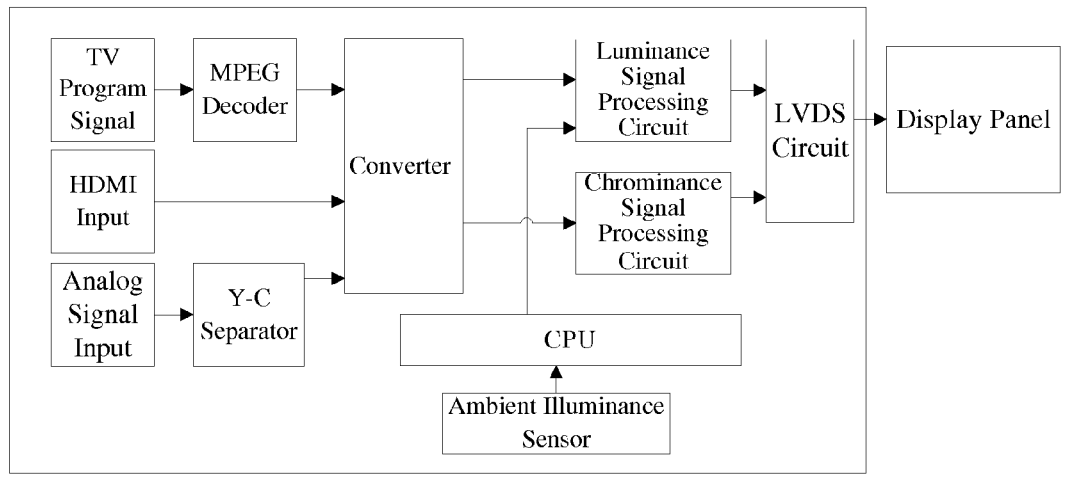
FIG. 1 is a schematic diagram showing a configuration of a conventional image signal processing system.
Figure 2:
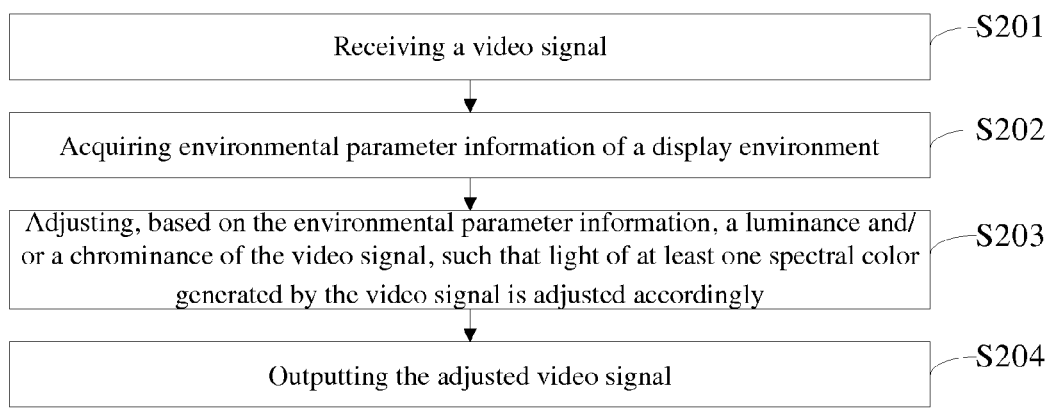
FIG. 2 is a schematic flow diagram of an image signal processing method according to an embodiment of the present invention.

A further description of the invention will be made in detail as below with reference to embodiments of the present invention taken in conjunction with the accompanying drawings. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art. As shown in FIG. 2, a light adjusting method according to an embodiment of the present invention comprises the following steps.

At step S201, a video signal is received.

At step S202, environmental parameter information of a display environment is acquired.

The environmental parameter information may comprise various types of environmental information that affects user's viewing perception. For example, the environmental parameter information may comprise at least one of an ambient illuminance in a viewing environment where the user is located, a color saturation in a viewing environment where the user is located, a viewing distance, an ambient color temperature, a viewing duration or the like. In the embodiments of the present invention, the environmental parameter information including the ambient illuminance and/or the user's viewing distance is taken as an example for the description.

At step S203, a luminance and/or a chrominance of the video signal is adjusted based on the environmental parameter information, such that light of at least one spectral color generated by the video signal is adjusted accordingly.

When a person watches a display for a long time, in most cases blue light emitted from a displayed picture is a direct factor which results in further deterioration of visual fatigue. Therefore, the luminance and/or chrominance of the video signal can be flexibly adjusted according to the environmental parameter information so as to adjust the blue light to be under an optimum state, thereby alleviating the visual fatigue phenomenon caused by the blue light. Of course, in the embodiments of the present invention, adjustment of only the blue light is also taken as an example for the description. It should be understood that the manner of adjusting light of one spectral color according to the embodiments of the present invention is also suitable for adjusting light of other spectral colors. The present invention is not limited to the example.

At step S204, the adjusted video signal is outputted.

With the image signal processing method according to the embodiments of the present invention, by acquiring environmental parameter information of a display environment, a luminance and/or a chrominance of the video signal is adjusted based on the environmental parameter information, such that light of at least one spectral color generated by the video signal is adjusted accordingly. In this way, light of a particular spectral color can be adjusted based on a viewing environment. In particular, blue light can be adjusted to be under an optimum state based on user's viewing environment, thereby reducing visual fatigue caused by the blue light, effectively protecting user's visual acuity, and remarkably improving perception of use of a display product.

Figure 3:
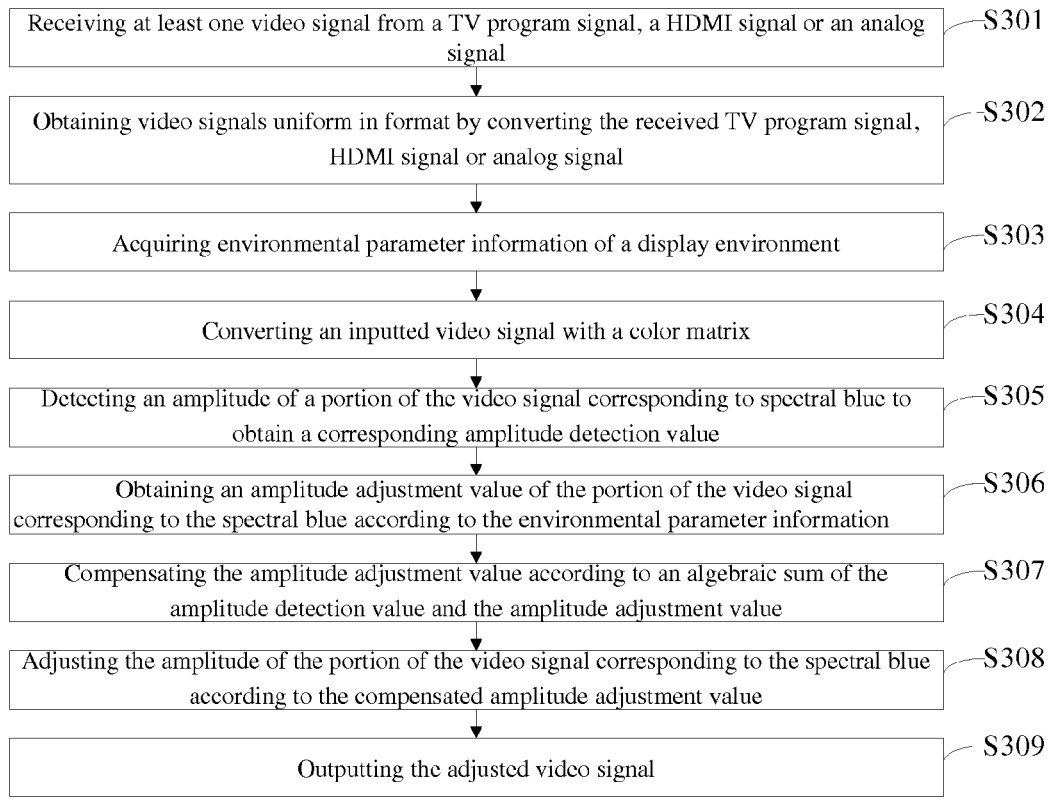
FIG. 3 is a schematic flow diagram of another image signal processing method according to an embodiment of the present invention.

In some embodiments, adjusting a portion of the video signal corresponding to the spectral blue accordingly based on the environmental parameter information of the display environment is taken as an example. As shown in FIG. 3, the image signal processing method according to the embodiments of the present invention may comprise the following steps.

At step S301, at least one video signal from a TV program signal, a HDMI signal or an analog signal is received.

It should be noted that the video signal in the embodiments of the present invention is not limited to the above-mentioned common video signals. This is only illustrative example.

At step S302, a video signal uniform in format is obtained by converting the received TV program signal, HDMI signal or analog signal.

At step S303, environmental parameter information of a display environment is acquired.

Although an intensity of blue light entering human eyes can be reduced by adjusting the portion of the video signal corresponding to the spectral blue accordingly based on the environmental parameter information of the display environment, this will result in degradation of entire reproduction ability of color of a picture, and also an apparent color shift. In order to overcome this defect, the following steps may be used for improvement purpose.

At step S304, an inputted video signal is converted with a color matrix.

At step S305, an amplitude of a portion of the video signal corresponding to spectral blue is detected to obtain a corresponding amplitude detection value.

At step S306, an amplitude adjustment value of the portion of the video signal corresponding to the spectral blue is obtained according to the environmental parameter information.

Specifically, the amplitude adjustment value of the portion of the video signal corresponding to the spectral blue may be obtained by, according to an inputted environmental parameter information, looking it up in a preset correspondence relationship table. The correspondence relationship table can be set according to actual situations. The present invention is not limited to this.

At step S307, the amplitude adjustment value is compensated according to an algebraic sum of the amplitude detection value and the amplitude adjustment value. If the amplitude detection value is decreased, the amplitude adjustment value is negative, while if the amplitude detection value is increased, the amplitude adjustment value is positive. For example, if it is judged that color shift occurs or exceeds a predetermined range based on the algebraic sum of the amplitude detection value and the amplitude adjustment value, the amplitude adjustment value is compensated such that no color shift is occur or the color shift is within the predetermined range.

At step S308, the amplitude of the portion of the video signal corresponding to the spectral blue is adjusted according to the compensated amplitude adjustment value.

With such a signal compensation method, the portion of the video signal corresponding to the spectral blue is adjusted according to the environmental parameter information of the display environment, while the color of the picture is not changed much, thereby effectively alleviating the color shift phenomenon of the displayed picture.

Furthermore, in the embodiments of the present invention, when the ambient illuminance is less than or equal to a preset illuminance value, and/or when user's viewing distance is less than or equal to a preset distance value, the amplitude of the portion of the video signal corresponding to the spectral blue may be decreased. Specifically, when the blue light is controlled according to the viewing distance only, an effect of decreasing fatigue of eyes is relatively unconspicuous. However, if the luminance of the blue light is controlled according to both the ambient illuminance and the user's viewing distance, the effect of alleviating fatigue of eyes can be greatly improved and thus a greatly comfortable picture quality can be obtained.

At step S309, the adjusted video signal is outputted.

With such an image processing method as mentioned above, light of a particular spectral color can be adjusted based on a viewing environment. In particular, blue light can be adjusted to be under an optimum state based on user's viewing environment, thereby reducing visual fatigue caused by the blue light, effectively protecting user's visual acuity, and remarkably improving perception of use of a display product.

Figure 4:
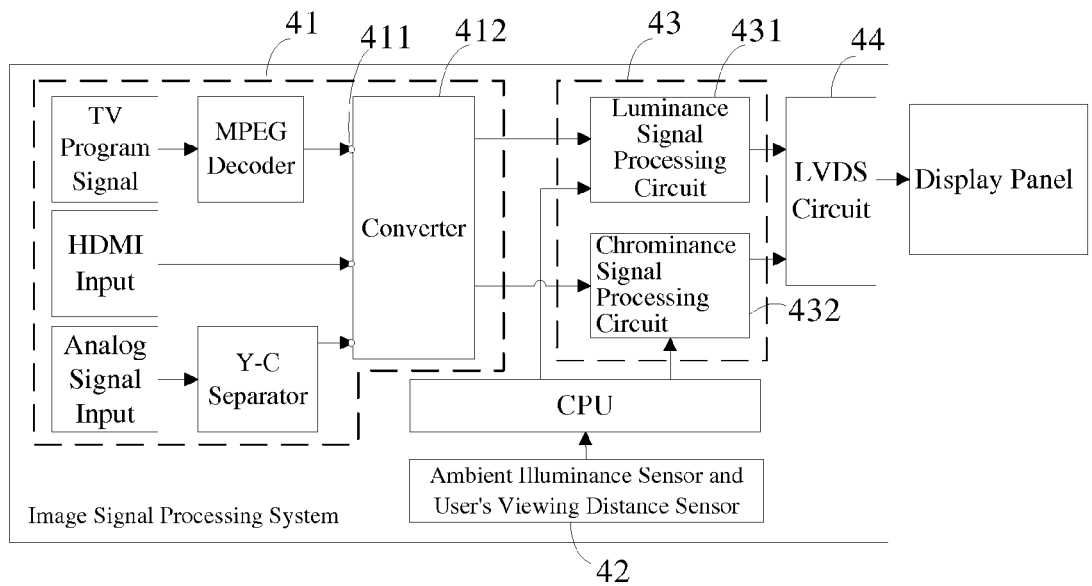
FIG. 4 is a schematic diagram showing a configuration of an image signal processing system according to an embodiment of the present invention.

As shown in FIG. 4, an image signal processing system according to an embodiment of the present invention comprises:

a receiving unit 41 for receiving a video signal; and a sensor 42 for acquiring environmental parameter information of a display environment.

The environmental parameter information may comprise various types of environmental information that affects user's viewing perception. For example, the environmental parameter information may comprise at least one of an ambient illuminance in a viewing environment where the user is located, a color saturation in a viewing environment where the user is located, a viewing distance, an ambient color temperature, a viewing duration or the like. In the embodiments of the present invention, the environmental parameter information including the ambient illuminance and/or the user's viewing distance is taken as an example for the description.

The system may further comprise a processing circuit 43. Specifically, the processing circuit 43 may comprise a luminance signal processing circuit 431 and/or a chrominance signal processing circuit 432 respectively configured to adjust, based on the environmental parameter information, a luminance and/or a chrominance of the video signal such that light of at least one spectral color generated by the video signal is adjusted accordingly.

When a person watches a display for a long time, in most cases blue light emitted from a displayed picture is a direct factor which results in further deterioration of visual fatigue. Therefore, the luminance and/or chrominance of the video signal can be flexibly adjusted according to the environmental parameter information so as to adjust the blue light to be under an optimum state, thereby alleviating the visual fatigue phenomenon caused by the blue light. Of course, in the embodiments of the present invention, adjustment of only the blue light is also taken as an example for the description. It should be understood that the manner of adjusting light of one spectral color according to the embodiments of the present invention is also suitable for adjusting light of other spectral colors. The present invention is not limited to the example.

The system may further comprise an output unit 44 for outputting the adjusted video signal.

Specifically, the output unit 44 may comprise an LVDS circuit.

With the image signal processing system according to the embodiments of the present invention, by acquiring environmental parameter information of a display environment, a luminance and/or a chrominance of the video signal is adjusted based on the environmental parameter information, such that light of at least one spectral color generated by the video signal is adjusted accordingly. In this way, light of a particular spectral color can be adjusted based on a viewing environment. For example, blue light can be adjusted to be under an optimum state based on user's viewing environment, thereby reducing visual fatigue caused by the blue light, effectively protecting user's visual acuity, and remarkably improving perception of use of a display product.

Figure 5:
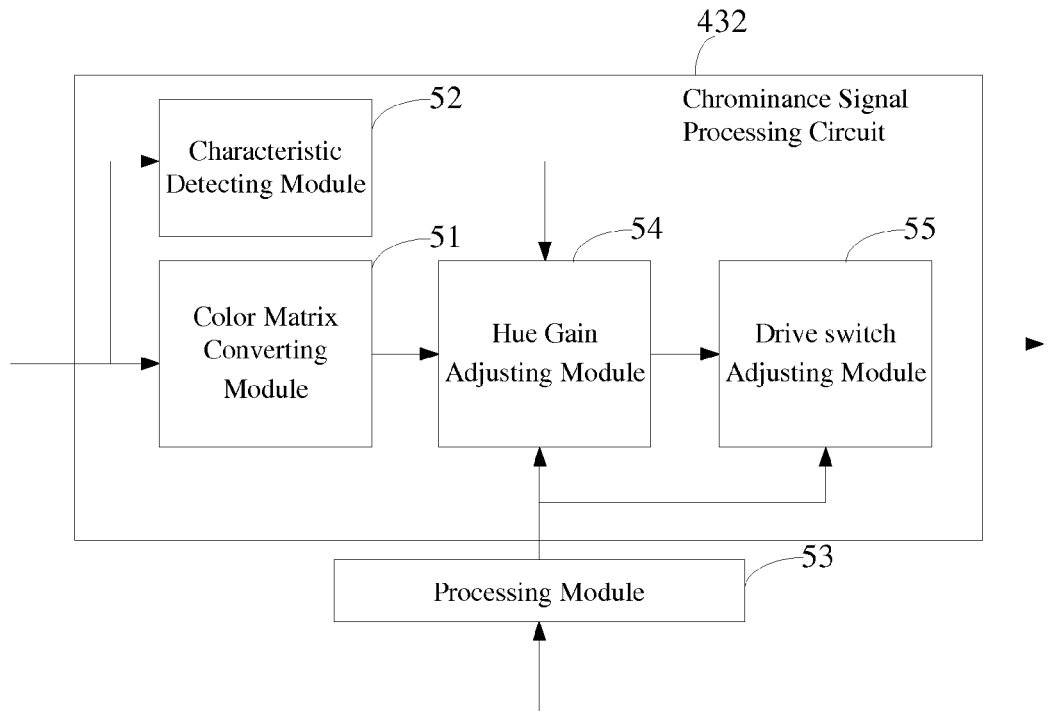
FIG. 5 is a schematic diagram showing a configuration of a chrominance signal processing circuit in the image signal processing system according to the embodiment of the present invention.

Furthermore, adjusting a portion of the video signal corresponding to the spectral blue accordingly based on the environmental parameter information of the display environment is taken as an example. As shown in FIG. 5, the chrominance signal processing circuit 432 may further comprise:

a color matrix converting module 51 for converting an inputted video signal with a color matrix;

a characteristic detecting module 52 for detecting an amplitude of a portion of the video signal corresponding to spectral blue to obtain a corresponding amplitude detection value;

a processing module 53 for obtaining an amplitude adjustment value of the portion of the video signal corresponding to the spectral blue according to the environmental parameter information;

a hue gain adjusting module 54 for compensating the amplitude adjustment value according to an algebraic sum of the amplitude detection value and the amplitude adjustment value; and a drive switch adjusting module 55 for adjusting the amplitude of the portion of the video signal corresponding to the spectral blue according to the compensated amplitude adjustment value.

With such a signal compensation method, the portion of the video signal corresponding to the spectral blue is adjusted according to the environmental parameter information of the display environment, while the color of the picture is not changed much, thereby effectively alleviating the color shift phenomenon of the displayed picture.

Furthermore, the chrominance signal processing circuit 432 may further configured to decrease the amplitude of the portion of the video signal corresponding to the spectral blue when the ambient illuminance is less than or equal to a preset illuminance value, and/or when a user's viewing distance is less than or equal to a preset distance value. Specifically, when the blue light is controlled according to the viewing distance only, an effect of decreasing fatigue of eyes is relatively unconspicuous. However, if the luminance of the blue light is controlled according to both the ambient illuminance and the user's viewing distance, the effect of alleviating fatigue of eyes can be greatly improved and thus a greatly comfortable picture quality can be obtained.

In addition, as shown in FIG. 4, the receiving unit 41 may further comprise:

an input 411 for receiving at least one video signal from a TV program signal, an HDMI signal or an analog signal.

It should be noted that the video signal in the embodiments of the present invention is not limited to the above-mentioned common video signals. This is only illustrative example.

The TV program signal may be inputted into the input 411 through a MPEG decoder, and the analog signal may be inputted into the input 411 through an analog-to-digital converter or a Y-C separator.

The receiving unit 41 may further comprise a converter 412 for obtaining a video signal uniform in format by converting the received TV program signal, HDMI signal or analog signal.

Figure 6:
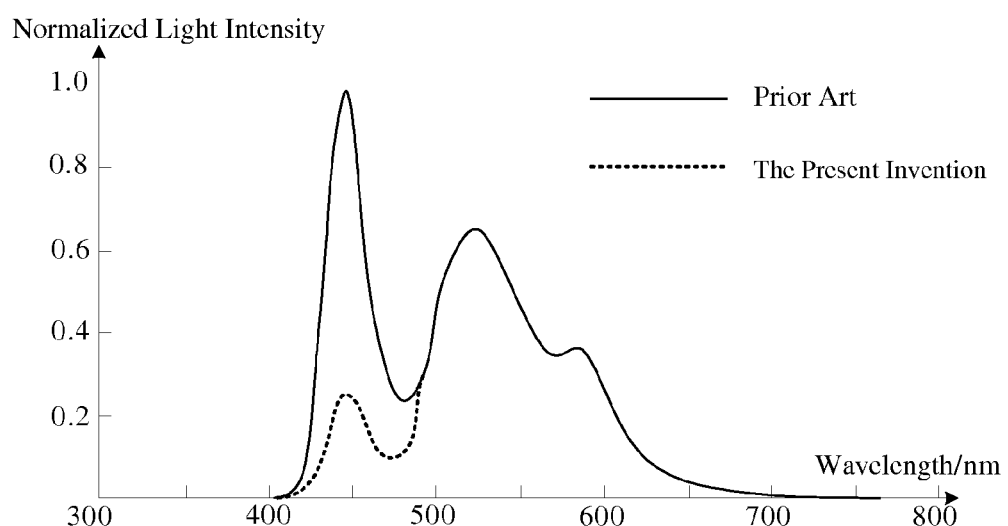
FIG. 6 is a schematic diagram in which spectrums are compared with each other.

With such a signal compensation system, referring to FIG. 6 for detailed spectral intensity characteristics, visible blue light is apparently reduced so that blue light entering into eyes can be decreased and fatigue of eyes can be effectively alleviated, compared with a conventional image signal system.

In this way, the portion of the video signal corresponding to the spectral blue is adjusted according to the environmental parameter information of the display environment, while the color of the picture is not changed much, thereby effectively alleviating the color shift phenomenon of the displayed picture.

In accordance with an embodiment of the present invention, there is also provided a display comprising the above-mentioned image signal processing system.

In the embodiments of the present invention, specifically, the display may comprise various known liquid crystal display apparatus or LED display apparatus.

Specifically, the liquid crystal display apparatus may be any products or parts having displaying function, such as a liquid crystal display, a liquid crystal TV, a digital frame, a mobile telephone, a tablet computer or the likes. Since the liquid crystal itself does not emit light, the image processing system according to the embodiment of the present invention can be used to control a backlight source to emit light so that light of at least one spectral color of the display can be controlled according to an environmental parameter while the backlight is provided. Alternatively, the image processing system according to the embodiments of the present invention can also control a light emitting assembly of an LED display apparatus. The LED display apparatus may be any existing LED device. By controlling the light emitting assembly of the LED display apparatus by means of the image processing system according to the embodiment of the present invention, light of at least one spectral color of the display can be controlled according to an environmental parameter while achieving the color display.

The detailed configuration of the image signal processing system has been described in the above embodiments in detail and thus is no longer described for the sake of brevity.

With the display, according to the embodiments of the present invention, comprising the image signal processing system, by acquiring environmental parameter information of a display environment, a luminance and/or a chrominance of the video signal is adjusted based on the environmental parameter information, such that light of at least one spectral color generated by the video signal is adjusted accordingly. In this way, light of a particular spectral color can be adjusted based on a viewing environment. In particular, blue light can be adjusted to be under an optimum state based on user's viewing environment, thereby reducing visual fatigue caused by the blue light, effectively protecting user's visual acuity, and remarkably improving perception of use of a display product.

Those skilled in the art will recognize that all or some of the steps achieving the above method according to the embodiments of the present invention can be performed by instructing a relevant hardware by a computer program. The program can be stored in a computer-readable storage medium comprising various mediums that can store program codes such as a ROM, a RAM, a disk or an optical disc. When the program is executed, the steps of the above method according to the embodiments of the present invention are performed.

The above embodiments are only used to explain the present invention, and should not be construed to limit the present invention. It will be understood by those skilled in the art that various changes and modifications may be made therein without departing from the spirit of the present invention, the scope of which is defined in the appended claims and their equivalents. Apparently, it will be understood by those skilled in the art that various changes, modifications, substitutions and alterations may be made.

The invention claimed is:

1. An image signal processing method comprising steps of:
   receiving a video signal;
   acquiring environmental parameter information of a display environment;
   adjusting, based on the environmental parameter information, a chrominance of the video signal such that light of at least one spectral color generated by the video signal is adjusted accordingly; and
   outputting the adjusted video signal;
   wherein the step of adjusting, based on the environmental parameter information, the chrominance of the video signal comprises steps of:
      converting the video signal with a color matrix;
      detecting an amplitude of a portion of the video signal corresponding to the spectral color to obtain a corresponding amplitude detection value;
      obtaining an amplitude adjustment value of the portion of the video signal corresponding to the spectral color according to the environmental parameter information;
      compensating the amplitude adjustment value according to an algebraic sum of the amplitude detection value and the amplitude adjustment value; and
      adjusting the amplitude of the portion of the video signal corresponding to the spectral color according to the compensated amplitude adjustment value; and
   wherein the step of compensating the amplitude adjustment value comprises a step of:
      compensating the amplitude adjustment value such that no color shift occurs or the color shift is within a predetermined range if it is judged that the color shift occurs or exceeds the predetermined range based on the algebraic sum of the amplitude detection value and the amplitude adjustment value.

2. The image signal processing method of claim 1, wherein the environmental parameter information comprises an ambient illuminance and/or a user's viewing distance.

3. The image signal processing method of claim 2, wherein the step of adjusting, based on the environmental parameter information the chrominance of the video signal comprises a step of:
   decreasing the amplitude of the portion of the video signal corresponding to the spectral color when the ambient illuminance is less than or equal to a preset illuminance value, and/or when the user's viewing distance is less than or equal to a preset distance value.

4. The image signal processing method of claim 1, wherein the step of receiving the video signal comprises steps of:
   receiving at least one of a TV program signal, a HDMI signal or an analog signal; and
   obtaining the video signal having a uniform format by converting the received TV program signal, HDMI signal or analog signal.

5. An image signal processing system comprising:
   a receiving unit for receiving a video signal;
   a sensor for acquiring environmental parameter information of a display environment;
   a processing circuit comprising a chrominance signal processing circuit configured to adjust, based on the environmental parameter information, a chrominance of the video signal, such that light of at least one spectral color generated by the video signal is adjusted accordingly; and
   an output unit for outputting the adjusted video signal;
   wherein the chrominance signal processing circuit comprises:
      a color matrix converting module for converting the video signal with a color matrix;
      a characteristic detecting module for detecting an amplitude of a portion of the video signal corresponding to the spectral color to obtain a corresponding amplitude detection value;
      a processing module for obtaining an amplitude adjustment value of the portion of the video signal corresponding to the spectral color according to the environmental parameter information;
      a hue gain adjusting module for compensating the amplitude adjustment value according to an algebraic sum of the amplitude detection value and the amplitude adjustment value; and
      a drive switch adjusting module for adjusting the amplitude of the portion of the video signal corresponding to the spectral color according to the compensated amplitude adjustment value; and wherein the hue gain adjusting module is further configured to compensate the amplitude adjustment value such that no color shift occurs or the color shift is within a predetermined range if it is judged that the color shift occurs or exceeds the predetermined range based on the algebraic sum of the amplitude detection value and the amplitude adjustment value.

6. The image signal processing system of claim 5, wherein the environmental parameter information comprises an ambient illuminance and/or a user's viewing distance.

7. The image signal processing system of claim 6, wherein the chrominance signal processing circuit is further configured to decrease the amplitude of the portion of the video signal corresponding to the spectral color when the ambient illuminance is less than or equal to a preset illuminance value, and/or when the user's viewing distance is less than or equal to a preset distance value.

8. The image signal processing system of claim 5, wherein the receiving unit comprises:
   an input for receiving at least one of a TV program signal, a HDMI signal or an analog signal; and
   a converter for obtaining the video signal uniform in format by converting the received TV program signal, HDMI signal or analog signal.

9. A display comprising the image signal processing system of claim 5.

10. The image signal processing method of claim 1, wherein the spectral color comprises spectral blue.

11. The image signal processing method of claim 3, wherein the spectral color comprises spectral blue.

12. The image signal processing system of claim 5, wherein the spectral color comprises spectral blue.

13. The image signal processing system of claim 7, wherein the spectral color comprises spectral blue.

* * * * *